(12) United States Patent
Carmona

(10) Patent No.: US 11,247,314 B1
(45) Date of Patent: Feb. 15, 2022

(54) DEVICE FOR REMOVING OR TIGHTENING LUG NUTS

(71) Applicant: Danny Carmona, McFarland, CA (US)

(72) Inventor: Danny Carmona, McFarland, CA (US)

(*) Notice: Subject to any disclaimer, the term of this patent is extended or adjusted under 35 U.S.C. 154(b) by 0 days.

(21) Appl. No.: 15/629,647

(22) Filed: Jun. 21, 2017

Related U.S. Application Data

(60) Provisional application No. 62/352,996, filed on Jun. 21, 2016.

(51) Int. Cl.
  *B25B 17/02* (2006.01)
  *B23P 19/06* (2006.01)

(52) U.S. Cl.
  CPC ............ *B25B 17/02* (2013.01); *B23P 19/069* (2013.01)

(58) Field of Classification Search
  CPC ... B25B 17/02; B25B 21/002; B25B 13/5016; B23P 19/069; E21B 19/164; E21B 19/168; B60B 29/006
  See application file for complete search history.

(56) References Cited

U.S. PATENT DOCUMENTS

| | | | | |
|---|---|---|---|---|
| 2,781,682 A * | 2/1957 | Herndon | ............... | B23P 19/069 74/664 |
| 2,836,090 A * | 5/1958 | Ray | ......................... | B25B 21/00 73/862.21 |
| 3,905,254 A * | 9/1975 | Palatnick | ............... | B23P 19/069 81/57.22 |
| 5,074,170 A * | 12/1991 | Shirley | ................... | B25B 17/00 74/606 R |
| 5,277,085 A * | 1/1994 | Tanimura | .............. | B23P 19/069 81/57.14 |
| 6,134,989 A * | 10/2000 | Stevens | ................. | B23P 19/069 81/57.22 |
| 6,305,245 B1 * | 10/2001 | Kress | .................... | B23P 19/069 81/57.14 |
| 6,668,685 B2 * | 12/2003 | Boston | .................. | B23P 19/069 81/57.22 |
| 7,077,031 B1 * | 7/2006 | Frederiksen | .......... | B23P 19/069 81/177.5 |
| 9,890,600 B1 * | 2/2018 | Tran | ....................... | E21B 19/164 |

* cited by examiner

*Primary Examiner* — David B. Thomas
(74) *Attorney, Agent, or Firm* — R. Scott Kimsey, Esq.

(57) ABSTRACT

A portable device for tightening or removing lug nuts includes a housing defining an interior reservoir, a first conduit, and a second conduit. The first conduit is in fluid communication with the interior reservoir and the second conduit is in fluid communication with the first conduit. A receiving chamber is provided within the housing and is also in fluid communication with the second housing. A hand pump associated with the device is operable to draw fluid within the reservoir into the first conduit, and also to force the fluid in the first conduit through the second conduit and into the receiving chamber. A first gear is rotatably disposed within the housing. A plurality of second gears are rotatably disposed within the housing. The plurality of second gears engage the first gear so that rotation of the first gear causes a corresponding rotation of the plurality of second gears. Each of the plurality of second gears is configured to engage a lug nut associated within the wheel of a vehicle.

6 Claims, 3 Drawing Sheets

DEVICE FOR REMOVING OR TIGHTENING LUG NUTS

RELATED APPLICATIONS

This application claims priority of U.S. Provisional Patent Application No. 62/352,996, filed Jun. 21, 2016 and entitled "Lug Nut Remover," which application is incorporated herein by reference.

BACKGROUND AND FIELD

1. Field

The present device relates generally to devices for removing or installing tires on a vehicle, and more specifically to a device for removing or tightening lug nuts securing a vehicle tire.

2. Background

Removal or installation of a vehicle tire requires manipulation of the lug nuts used to retain the tire in place. In order to remove a vehicle tire, lug nuts holding the tire in place must be removed. Lug nuts are often tightened with a pneumatic impact wrench or other device that tightens the lug nuts beyond the degree to which a human might tighten the lug nuts by hand. Whether by hand or mechanical/pneumatic means, installing a tire requires tightening of lug nuts to an extent consistent with the safe retention of the tire. Substantial force may be required on the part of an individual removing or tightening lug nuts on a vehicle. The use of force required may lead to accident or injury, and may put an individual in a dangerous situation when removing or installing a tire near the edge of a busy roadway. Further, individuals with physical weaknesses may be unable to remove or tighten the lug nuts properly without mechanical or pneumatic assistance, and devices providing such assistance are located in mechanic's shops or other locales where they cannot be readily transported in a vehicle. Even were such items readily transportable, they typically require electrical or other external power that may not be available to a user who needs to change a tire on the road.

What is needed, then, is a portable device for tightening and removing lug nuts without a substantial output of strength from a user of the device, and without the need for electrical or other external power sources.

SUMMARY

The present disclosure provides a portable device for removal or tightening of vehicle lug nuts without a significant expenditure of strength on the part of the individual performing the operation, and without the need for electrical or other external power beyond human effort.

In one aspect of the disclosure, the portable device includes a housing defining an interior reservoir, a first conduit, and a second conduit. The first conduit is in fluid communication with the interior reservoir and the second conduit is in fluid communication with the first conduit. A receiving chamber is provided within the housing and is also in fluid communication with the second housing. A hand pump associated with the device is operable to draw fluid within the reservoir into the first conduit, and also to force the fluid in the first conduit through the second conduit and into the receiving chamber. A first gear is rotatably disposed within the housing. A plurality of second gears are rotatably disposed within the housing. The plurality of second gears engage the first gear so that rotation of the first gear causes a corresponding rotation of the plurality of second gears. Each of the plurality of second gears is configured to engage a lug nut associated within the wheel of a vehicle.

In another aspect of the present disclosure, the device further includes a plurality of countergears, each countergear positioned between two second gears and engaging both of the second gears.

In another aspect of the present disclosure, the first gear is an impeller having a rim with a plurality of teeth defined along an internal perimeter of the rim. The teeth of the impeller rim engage the teeth of the plurality of second gears.

In another aspect of the present disclosure, the receiving chamber includes a first inlet and a second inlet, both of which are in fluid communication with the second conduit. The device is configured such that a user of the device may selectively open the first inlet or the second inlet. When fluid moves into the receiving chamber through the first inlet, the first gear rotates in a first direction. When fluid moves into the receiving chamber through the second inlet, the first gear rotates in a second direction.

Another aspect of the present disclosure provides a portable device for removal or tightening of lug nuts that includes a housing defining an interior reservoir, a first conduit in fluid communication with the interior reservoir, and a second conduit in fluid communication with the first conduit. A receiving chamber is defined within the housing and is in fluid communication with the second conduit. An impeller is rotatably disposed within the receiving chamber such that fluid entering the receiving chamber impinges on the impeller and causes rotation of the impeller. The impeller includes a rim having an internal perimeter that includes a plurality of gear teeth. A plurality of socket gears are rotatably disposed within the housing. The socket gears each include a toothed perimeter engaging the internal perimeter of the impeller such that rotation of the impeller causes a corresponding rotation of the socket gear. A hand pump is operable to draw fluid from the reservoir into the first conduit, and to force fluid through the second conduit and into the receiving chamber.

DETAILED DESCRIPTION

Figure 1:
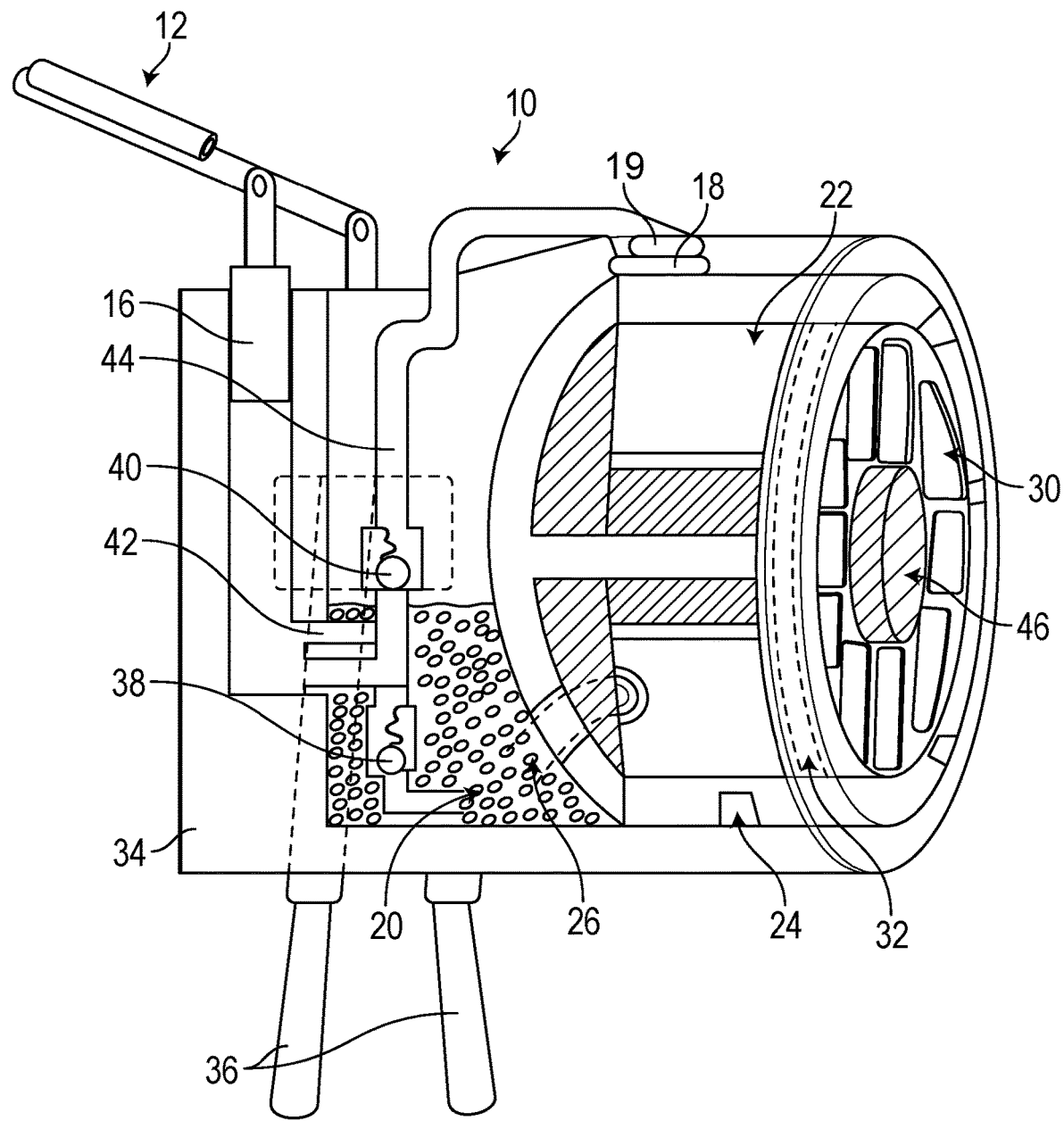
FIG. 1 provides a side, cut-away view of one embodiment of a device of the present disclosure showing details of the interior of the device.

Turning now to the drawings, wherein like numerals indicate like parts, FIG. 1 depicts one embodiment of a lug nut removal and tightening device 10 of the present disclosure. The details and operation of the embodiment shown in FIG. 1 are now provided. It should be understood, however, that alternative embodiments to those that are described here may be apparent to those of skill in the art upon reading this disclosure, and that such alternative embodiments remain within the scope of the present disclosure.

The embodiment of device 10 shown in FIG. 1 includes a housing 34, which houses most of the components of the device. Within the housing is a reservoir 20 for retaining hydraulic oil or other incompressible fluid. Device 10 is prepared for use by mating secondary gears 30, also referred to herein as socket gears (described in greater detail, below), with a plurality of lug nuts associated with a vehicle wheel. Supports 36 may be provided in some embodiments of device 10 so that the device may be maintained in the proper position when attached to the lug nuts associated with the wheel of a vehicle.

Other elements of device 10 are now described in conjunction with the operation of the device. Once device 10 has been attached to one or more lug nuts associated with the wheel of a vehicle through the use of sockets attached to one or more socket gears 30, an operator of the device actuates lever 12. Movement of lever 12 in an upward direction draws hydraulic oil (in the embodiment shown) from reservoir 20 into first conduit 42. Movement of lever in 12 in a downward direction forces the hydraulic oil through second conduit 44 and into receiving chamber 22. Ball check valves 38 and 40 prevent unwanted reverse flow of hydraulic oil through first conduit 42 and second conduit 44, respectively. Although ball check valves are shown and described herein, it is contemplated that any suitable valves may be used. Hydraulic oil enters receiving chamber 22 through one of first inlet 18 or second inlet 19. A user of device 10 may utilize a switch, sliding divider, toggle, or any other suitable mechanism to selectively divert the flow of hydraulic fluid through one of the two inlets. Mechanisms, structures, and methods for selectively directing fluid flow through one of two openings are known in the art and are not described in detail here. The inlet through which hydraulic fluid enters receiving chamber determines the direction of rotation of an impeller gear 24, which rotates about a shaft 46 rotatably affixed to the housing of the device. Excess hydraulic oil exits receiving chamber 22 via outlet 8, which directs the hydraulic oil back into reservoir 20. The edges of impeller gear 24 are preferably in sealing engagement with an interior surface of device 10 so that fluid directed into the receiving chamber cannot flow around impeller gear 24 but is instead used to impart rotational motion to impeller gear 24.

Figure 3:
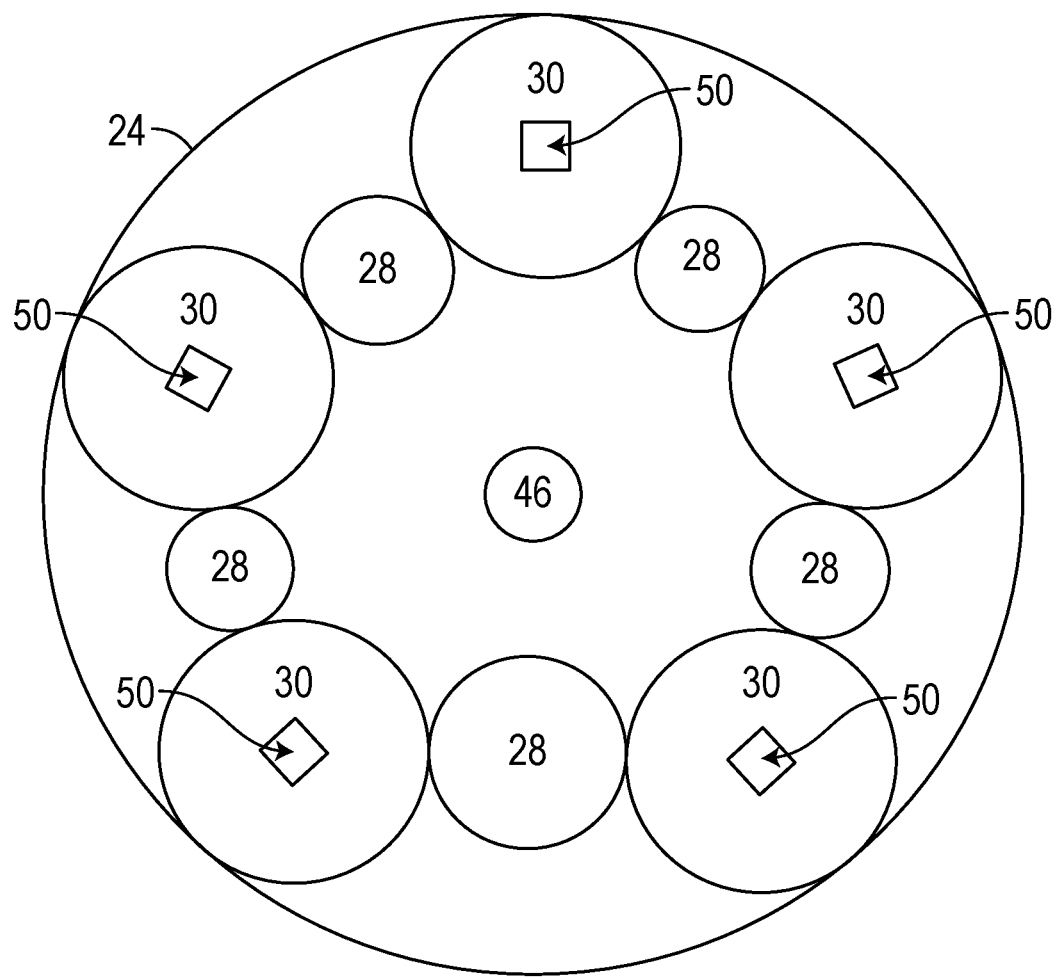
FIG. 3 provides an elevation view of the gear interactions of one embodiment of a device of the present disclosure.

Rotation of impeller gear 24 causes a corresponding rotation of a plurality of socket gears 30. Socket gears 30 are preferably rotatably disposed upon a stationary support 32, which does not move with rotation of the gears. Movement of impeller gear 24 results in a corresponding movement of each of the plurality of socket gears 30, preferably through engagement of the teeth of socket gears thirty with a plurality of teeth along an inner perimeter of a rim of the impeller gear 24 (as best shown in FIG. 3). The lug nuts associated with a vehicle wheel are connected to the plurality of socket gears 30, preferably through the use of sockets 48 retained in slots 50 of sockets gears 30, and depending on the direction of rotation of impeller gear 24, the lug nuts will either be tightened or loosened/removed by the movement of the plurality of socket gears 30.

Figure 2:
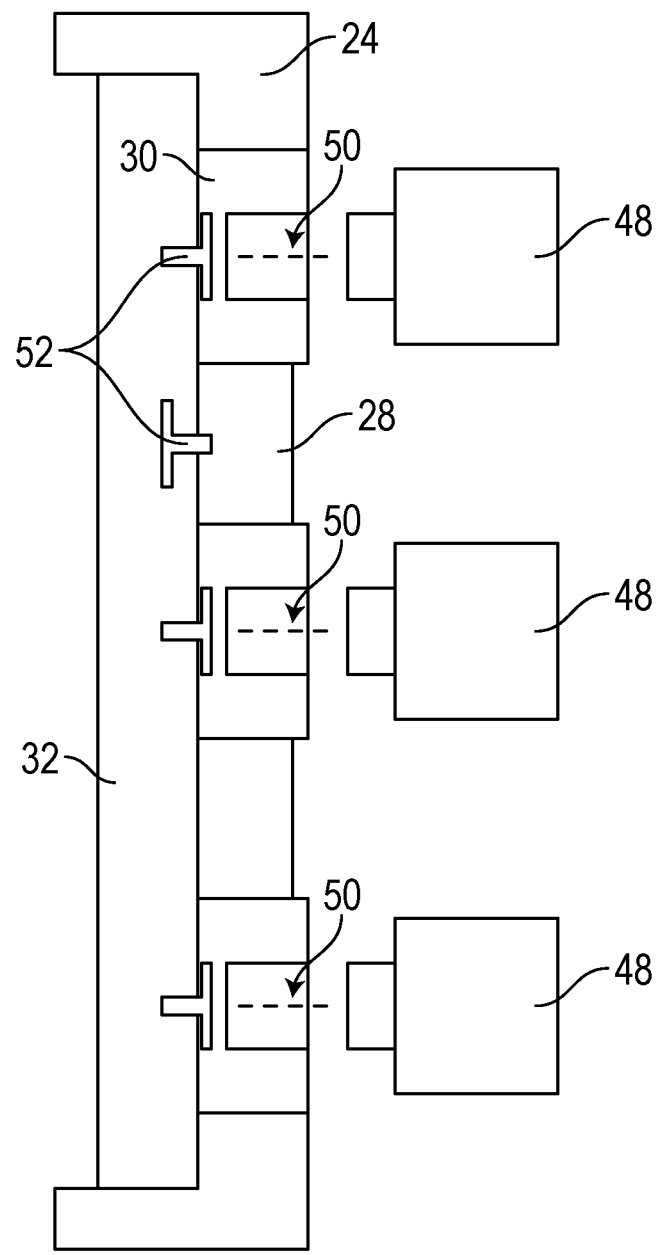
FIG. 2 provides a side cross-section view of the gear interactions of one embodiment of a device of the present disclosure.

FIG. 2 provides a view of the relationship between the impeller gear 24 and socket gears 30. Also shown are sockets 48, which include protrusions configured to be received into slots 50 of socket gears 30. Once sockets 48 are received into slots 50, they are securely retained and rotate along with the rotational movement of a respective socket gear. Also shown in FIG. 2 is a countergear 28, also rotatably attached to stationary support 32. Countergear 28 is disposed between two socket gears 30, and engages each of the socket gears. If too much force is exerted on a socket gear 30, that force is distributed to an adjacent socket gear 30 through countergear 28. Countergears 28 may be provided between all adjacent socket gears 30, or only between select socket gears 30.

FIG. 3 is an elevation view of the interactions between various gears of device 10. Although not shown in the figure, the internal perimeter of the rim of impeller gear 24 includes gear teeth, as do each of the gears 28 and 30 shown. The teeth along the internal perimeter of a rim of impeller gear 24 engage the teeth of a plurality of socket gears 30. A plurality of countergears 28 are disposed between the socket gears 30 and engaged with the socket gears 30. Socket gears 30 each include a slot 50 for receipt of a socket 48 therein.

As demonstrated from the description above, and the attached drawings, the present device can use used to remove or tighten all lug nuts associated with a vehicle wheel simultaneously, or may be used to remove or tighten less than all such lug nuts. Regardless of the number of lug nuts being removed or tightened, the present device, through gearing and use of an incompressible fluid such as hydraulic oil, allows for manipulation of the lug nuts without a great deal of strength on the part of the user.

It is contemplated that in a preferred embodiment the present invention is entirely hand-operated, requiring no electrical or other external power source. Some embodiments of the present device may, however, be adapted for use with a power source commonly available from a vehicle, such as by plugging into a cigarette lighter or other outlet of an automobile.

Although gears are used for providing rotational energy to various components of the present device, it is contemplated that other structures suitable for transmitting rotational energy or movement may also be used, including, for example, engaging surfaces that transfer energy via friction. Further, although first and second conduits are shown, a single conduit may be associated with the hand pump, or more than two conduits may be used. A chamber may be provided between two or more of the conduits for receipt of hydraulic fluid prior to being directed into the receiving chamber.

Embodiments of the present device may be configured for use with standard lug nuts associated with typical consumer automobiles. It is contemplated, however, that other embodiments of the present disclosure may be adapted for use with lug nuts of varying sizes, either larger or smaller than those commonly associated with a consumer automobile.

Although various components are described and shown herein as being contained within housing 34, it is contemplated that certain components may be exterior to the housing. For example, a reservoir for hydraulic fluid could be located external to the housing, as could portions of various conduits. Such modifications remain within the scope of the present disclosure.

The various features and embodiments of the present device disclosed above are illustrative of the present disclosure and are meant to be exemplary. Various modifications or alterations to what is disclosed herein may be readily apparent to those of skill in the art upon reading this disclosure, and it is contemplated that such modifications or alterations remain within the spirit, and scope, of the present invention.

Having thus described the preferred embodiment of the invention, what is claimed as new and desired to be protected by Letters Patent includes the following:

1. A portable device for removal or tightening of lug nuts comprising:
   a housing defining an interior reservoir, a first conduit in fluid communication with the interior reservoir, and a second conduit in fluid communication with the first conduit;
   a receiving chamber defined within said housing and in fluid communication with said second conduit;
   a hand pump operable to draw fluid from within said reservoir and into said first conduit, and operable to force said fluid from said first conduit through said second conduit and into said receiving chamber;
   an impeller gear rotatably disposed within said receiving chamber and configured to rotate when said impeller gear is impacted by said fluid forced into the receiving chamber; and
   a plurality of second gears rotatably disposed within said housing, said plurality of second gears engaging said impeller gear such that rotation of said impeller gear causes a corresponding rotation of said plurality of second gears,
   wherein each of said plurality of second gears is configured to engage a lug nut associated with the wheel of a vehicle.

2. The device according to claim 1, further comprising a plurality of countergears, each of said plurality of countergears disposed between two of said second gears and engaging both of said second gears.

3. The device according to claim 1, wherein said receiving chamber comprises a first inlet and a second inlet, said first and second inlets both in fluid communication with said second conduit, further wherein the device is configured such that a user may selectively open said first inlet or said second inlet, and further wherein when fluid moves into the receiving chamber through said first inlet the impeller gear rotates in a first direction, and when fluid moves into the receiving chamber through said second inlet, the impeller gear rotates in a second direction.

4. A portable device for removal or tightening of lug nuts comprising:
   a housing defining an interior reservoir, a first conduit in fluid communication with said interior reservoir, and a second conduit in fluid communication with said first conduit;
   a receiving chamber defined within said housing in fluid communication with said second conduit;
   an impeller rotatably disposed within said receiving chamber such that fluid entering said receiving chamber impinges said impeller and causes rotation thereof, wherein said impeller comprises a rim have an internal perimeter comprising a plurality of gear teeth;
   a plurality of socket gears rotatably disposed within said housing, said socket gears each comprising a perimeter engaging the internal perimeter of the impeller such that rotation of the impeller causes a corresponding rotation of the socket gear; and
   a hand pump operable to draw fluid from within said reservoir and into said first conduit, and operable to force fluid from said first conduit through said second conduit and into said receiving chamber.

5. The device according to claim 4, wherein said receiving chamber comprises a first inlet and a second inlet, said first and second inlets both in fluid communication with said second conduit, further wherein the device is configured such that a user may selectively open said first inlet or said second inlet, and further wherein when fluid moves into the receiving chamber through said first inlet the impeller rotates in a first direction, and when fluid moves into the receiving chamber through said second inlet, the impeller rotates in a second direction.

6. The device according to claim 5, further comprising a plurality of countergears, each of said plurality of countergears disposed between two of said socket gears and engaging both of said socket gears.

\* \* \* \* \*